United States Patent
Wu et al.

(10) Patent No.: US 10,019,330 B2
(45) Date of Patent: Jul. 10, 2018

(54) PROVIDING FAULT TOLERANCE IN A VIRTUALIZED COMPUTING ENVIRONMENT THROUGH A MIGRATION APPROACH BASED ON RESOURCE AVAILABILITY

(71) Applicant: VMware, Inc., Palo Alto, CA (US)

(72) Inventors: Xiaojin Wu, Shanghai (CN); Pin Xie, Shanghai (CN); Shi Chen, Shanghai (CN); Biwen Li, Shanghai (CN); Yan Su, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 55 days.

(21) Appl. No.: 14/964,847

(22) Filed: Dec. 10, 2015

(65) Prior Publication Data

US 2017/0168906 A1    Jun. 15, 2017

(51) Int. Cl.
| | | |
|---|---|---|
| *G06F 11/00* | | (2006.01) |
| *G06F 11/20* | | (2006.01) |
| *G06F 9/455* | | (2018.01) |

(52) U.S. Cl.
CPC ........ *G06F 11/203* (2013.01); *G06F 9/45558* (2013.01); *G06F 11/006* (2013.01); *G06F 2009/4557* (2013.01); *G06F 2009/45591* (2013.01); *G06F 2201/85* (2013.01)

(58) Field of Classification Search
CPC .................................................. G06F 11/203
See application file for complete search history.

(56) References Cited

U.S. PATENT DOCUMENTS

| | | | |
|---|---|---|---|
| 8,230,256 B1 * | 7/2012 | Raut | G06F 11/2028 714/13 |
| 9,021,459 B1 | 4/2015 | Qu | |
| 9,223,597 B2 | 12/2015 | Deshpande et al. | |
| 9,350,682 B1 * | 5/2016 | Gupta | G06F 9/45558 |
| 2010/0076934 A1 | 3/2010 | Pershin et al. | |
| 2011/0060722 A1 | 3/2011 | Li et al. | |
| 2013/0091376 A1 | 4/2013 | Raspudic et al. | |
| 2013/0111471 A1 * | 5/2013 | Chandrasekaran | G06F 9/455 718/1 |
| 2013/0290782 A1 * | 10/2013 | Chen | G06F 11/1438 714/19 |
| 2015/0180765 A1 | 6/2015 | Alvarez et al. | |

(Continued)

*Primary Examiner* — Christopher S McCarthy
(74) *Attorney, Agent, or Firm* — Su IP Consulting

(57) ABSTRACT

An example method is described to provide fault tolerance in a virtualized computing environment with a first fault domain and a second fault domain. The method may comprise determining whether a primary virtualized computing instance and a secondary virtualized computing instance are both in the first fault domain. The secondary virtualized computing instance may be configured as a backup for the primary virtualized computing instance and supported by a first host. The method may further comprise: in response to determination that the primary virtualized computing instance and secondary virtualized computing instance are both in the first fault domain, selecting, from the second fault domain, a second host based on a resource availability of the second host; and migrating the secondary virtualized computing instance from the first host to the second host, thereby migrating the secondary virtualized computing instance from the first fault domain to the second fault domain.

18 Claims, 10 Drawing Sheets

(56) References Cited

U.S. PATENT DOCUMENTS

2015/0249615 A1 9/2015 Chen et al.
2017/0168906 A1 6/2017 Wu et al.
2018/0054395 A1 2/2018 Carey et al.

* cited by examiner

810

VM Distribution List

| VM | Primary | Secondary | Not Compliant |
|---|---|---|---|
| VM-1 | FD1 | FD1 | 1 |
| VM-2 | FD1 | FD2 | 0 |
| VM-3 | FD2 | FD3 | 0 |
| VM-4 | FD3 | FD1 | 0 |
| VM-5 | FD2 | FD1 | 0 |
| VM-6 | FD3 | FD3 | 1 |

820

FDMatrix (Initial)

| FD | FD1 | FD2 | FD3 |
|---|---|---|---|
| FD1 | 1 (VM-1) | 1 (VM-2) | 0 |
| FD2 | 1 (VM-5) | 0 | 1 (VM-3) |
| FD3 | 1 (VM-4) | 0 | 1 (VM-6) |

830

Resource Availability Table (Initial)

| Host | FD | Resource Availability |
|---|---|---|
| D | FD2 | $RA_D$ (most) |
| B | FD1 | $RA_B$ |
| C | FD2 | $RA_C$ |
| E | FD3 | $RA_E$ |
| F | FD3 | $RA_F$ |
| A | FD1 | $RA_A$ (least) |

Fig. 8

910 FDMatrix (After Iteration 1)

| FD | FD1 | FD2 | FD3 |
|---|---|---|---|
| FD1 | 0 | 2 (VM-1, VM-2) | 0 |
| FD2 | 1 (VM-5) | 0 | 1 (VM-3) |
| FD3 | 1 (VM-4) | 0 | 1 (VM-6) |

914, 520, 912

920 Resource Availability (After Iteration 1)

| Host | FD | Resource Availability |
|---|---|---|
| B | FD1 | $RA_B$ (most) — 922 |
| D | FD2 | $RA_D$ |
| C | FD2 | $RA_C$ |
| E | FD3 | $RA_E$ |
| F | FD3 | $RA_F$ |
| A | FD1 | $RA_A$ (least) |

930 FDMatrix (After Iteration 2)

| FD | FD1 | FD2 | FD3 |
|---|---|---|---|
| FD1 | 0 | 2 (VM-1, VM-2) | 0 |
| FD2 | 1 (VM-5) | 0 | 1 (VM-3) |
| FD3 | 2 (VM-4, VM-6) | 0 | 0 |

934, 932

940 Resource Availability (After Iteration 2)

| Host | FD | Resource Availability |
|---|---|---|
| E | FD3 | $RA_E$ (most) — 942 |
| B | FD1 | $RA_B$ |
| D | FD2 | $RA_D$ |
| C | FD2 | $RA_C$ |
| F | FD3 | $RA_F$ |
| A | FD1 | $RA_A$ (least) |

Fig. 9

PROVIDING FAULT TOLERANCE IN A VIRTUALIZED COMPUTING ENVIRONMENT THROUGH A MIGRATION APPROACH BASED ON RESOURCE AVAILABILITY

CROSS-REFERENCE TO RELATED APPLICATIONS

The present application Ser. No. 14/964,847 is related in subject matter to U.S. patent application Ser. No. 14/964,831, which is incorporated herein by reference.

BACKGROUND

Unless otherwise indicated herein, the approaches described in this section are not admitted to be prior art by inclusion in this section.

Virtualization allows the abstraction of hardware resources and the pooling of these resources to support multiple virtual machines in a virtualized computing environment. For example, through virtualization, virtual machines running different operating systems may be supported by the same physical machine (known as a "host"). Each virtual machine is provisioned with virtual resources that provide similar functions as the physical hardware of the host, such as central processing unit (CPU) resources, memory resources, storage resources and network resources to run an operating system and applications.

The aim of virtual machine fault tolerance is to achieve a higher level of service continuity in the virtualized computing environment. For example, a pair of virtual machines designated as a "primary virtual machine" and a "secondary virtual machine" may be deployed as a fault tolerance strategy. Users usually interact with the primary virtual machine, and need not be aware of the secondary virtual machine. If the primary virtual machine fails, the secondary virtual machine takes over and continues to execute operations of the primary virtual machine. In order to provide fault tolerance, however, it is important that both the primary virtual machine and secondary virtual machine do not fail simultaneously.

BRIEF DESCRIPTION OF DRAWINGS

FIG. 8 is a schematic diagram illustrating example distribution list, fault domain matrix and resource availability table generated when the detailed example process in FIG. 7 is implemented in the virtualized computing environment in FIG. 5;

FIG. 9 is a schematic diagram illustrating example iterations of the detailed example process in FIG. 7 when implemented in the virtualized computing environment in FIG. 5.

DETAILED DESCRIPTION

Figure 1:
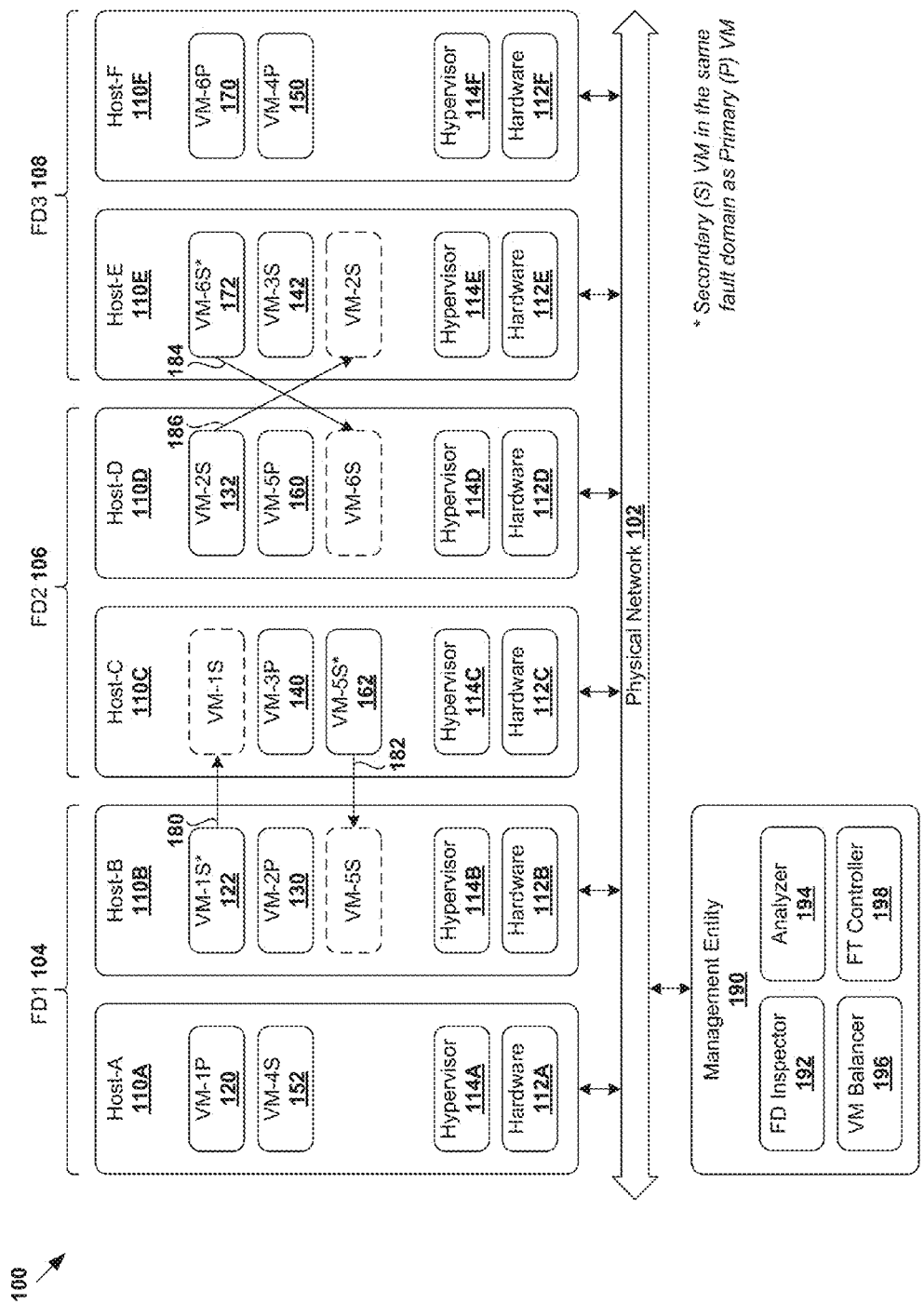
FIG. 1 is a schematic diagram illustrating an example virtualized computing environment in which fault tolerance is provided according to a first example approach.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of providing fault tolerance will be explained further using FIG. 1, which is a schematic diagram illustrating example virtualized computing environment 100 in which fault tolerance is provided according to a first example approach. It should be understood that virtualized computing environment 100 may include additional and/or alternative components than that shown, depending on the desired implementation.

In the example in FIG. 1, virtualized computing environment 100 includes multiple hosts (also known as "host computers," "physical servers," "server systems," "host computing systems," etc.), such as Host-A 110A, Host-B 110B, Host-C 110C, Host-D 110D, Host-E 110E and Host-F 110F. In the following, reference numerals with a suffix "A" relates to elements of Host-A 110A, suffix "B" to that of Host-B 110B, suffix "C" to that of Host-C 110C, suffix "D" to that of Host-D 110D, suffix "E" to that of Host-E 110E and suffix "F" relates to Host-F 110F. Although six hosts are shown for simplicity, any number of hosts may be deployed.

Each host 110A/110B/110C/110D/110E/110F includes suitable hardware 112A/112B/112C/112D/112E/112F and executes virtualization software (e.g., hypervisor 114A/114B/114C/114D/114E/114F) to support various virtual machines. Hardware 112A/112B/112C/112D/112E/112F may include any suitable physical resources (not shown for simplicity), such as processor (e.g., Central Processing Unit (CPU)), memory (e.g., random access memory), storage controller, storage resource (e.g., storage disk) accessible via the storage controller, network resource (e.g., network interface controller (NIC)) to connect to physical network 102, etc.

Hypervisor 114A/114B/114C/114D/114E/114F maintains a mapping between physical resources and virtual resources assigned to virtual machines. Hypervisor 114A/114B/114C/114D/114E/114F may be a "type 2" or hosted hypervisor that runs on top of a conventional operating system on host 110A/110B/110C/110D/110E/110F. Although not shown, hosts 110A-110E may form a cluster to aggregate their storage resources as a distributed storage system, such as Virtual Storage Area Network (VSAN), to store data relating the virtual machines (e.g., virtual disks, home objects, swap objects, snapshots, memory, etc.).

Although examples of the present disclosure refer to "virtual machines," it should be understood that virtual machines running within a virtualized computing environment are merely one example of "virtualized computing instances" (also known as "workloads"). In general, a virtualized computing instance may represent an addressable data compute node or isolated user space instance. In practice, any suitable technologies aside from hardware virtualization may be used to provide isolated user space instances. For example, other virtualized computing instances may include physical hosts, client computers, containers (e.g., running on top of a host operating system without the need for a hypervisor or separate operating system such as Docker; or implemented as an operating system level virtualization), virtual private servers, etc. The virtual machines may also be complete computation environments, containing virtual equivalents of the hardware and system software components of a physical computing system. As such, in the following, the term "primary virtual machine" should be understood as an example "primary virtualized computing instance," and "secondary virtual machine" as an example "secondary virtualized computing instance."

In the example in FIG. 1, hosts 110A-110E support various pairs of virtual machines (also known as a "fault-tolerant" pairs) that each include a primary (P) virtual machine and a secondary (S) virtual machine. For example, primary virtual machine "VM-1P" 120 and secondary virtual machine "VM-1S" 122 form a first pair; "VM-2P" 130 and "VM-2S" 132 form a second pair; "VM-3P" 140 and VM-3S 142 form a third pair; "VM-4P" 150 and "VM-4S" 152 form a fourth pair; "VM-5P" 160 and "VM-5S" 162 form a fifth pair; and "VM-6P" 170 and "VM-6S" form a sixth pair. Each virtual machine may execute a guest operating system (OS) to support one or more applications.

From a user's perspective, each pair appears as a single, logical virtual machine. The user interacts with the logical virtual machine via the primary virtual machine (e.g., VM-1P 120), while the secondary virtual machine (e.g., VM-1S 122) is configured as a backup for the primary virtual machine in the event of a failure. In order for the primary virtual machine to fail over to the secondary virtual machine without the loss of availability or data, the secondary virtual machine needs to have the same state information as the primary virtual machine had at the time of the failure. For example, this may involve the primary virtual machine sending state information to the secondary virtual machine to replicate the primary virtual machine.

Conventionally, primary and secondary virtual machines merely are distributed across different hosts. For example in FIG. 1, VM-1P 120 is supported by Host-A 110A and VM-1S 122 by Host-B 110B. This ensures that the failure of one host (e.g., Host-A 110A) does not affect both the primary virtual machine and secondary virtual machine. For the same reason, different hosts are used to support each pair of primary virtual machine and secondary virtual machine. In particular, VM-2P 130 is supported by Host-B 110B and VM-2S 132 by Host-D 110D; VM-3P 140 by Host-C 110C and VM-3S 142 by Host-E 110E; VM-4P 150 by Host-F 110F and VM-4S 152 by Host-A 110A; VM-5P 160 by Host-D 110D and VM-5S 162 by Host-C 110C and VM-6P 170 by Host-F 110F and VM-6S 172 by Host-E 110E.

However, according to the above conventional approach, it is still possible for the primary virtual machine and secondary virtual machine to fail simultaneously. For example, both Host-A 110A and Host-B 110B may be located on the same rack of a physical server in a datacenter. The same rack may be connected to the same power source or the same physical network. If there is a failure that affects that power source or physical network of the entire rack, both Host-A 110A and Host-B 110B will be affected. In this case, the primary virtual machine will fail, but the secondary virtual machine will not be able to take over, which is highly undesirable and adversely affects performance.

According to examples of the present disclosure, fault domain awareness is used to improve virtual machine fault tolerance. Here, the term "fault domain" may refer generally to logical boundaries or zone within which a failure may affect one or more hosts. Using the above example, servers (e.g., Host-A 110A and Host-B 110B) in the same rack may be within the same fault domain because they are more likely to suffer from the same failure. In practice, the failure may be power failure, software failure, hardware failure, network failure, any combination thereof, etc. For example in FIG. 1, three fault domains are shown. Host-A 110A and Host-B 110B are in a fault domain labelled "FD1" 104; Host-C 110C and Host-D 110D are in "FD2" 106 and Host-E 110E and Host-F 110F in "FD3" 108. Each fault domain may include any suitable number of hosts.

To improve fault tolerance in virtualized computing environment 100, it is determined whether a primary virtual machine (e.g., VM-1P 120) and a secondary virtual machine (e.g., VM-1S 122) are both in a first fault domain (e.g., FD1 104). If yes (i.e., same fault domain), the secondary virtual machine (e.g., VM-1S 122) is migrated to another host. In the following, two example approaches will be described.

In a first example approach, the secondary virtual machine (e.g., VM-1S 122 in FIG. 1) in the first fault domain (e.g., FD1 104 in FIG. 1) is "swapped" with another secondary virtual machine (e.g., VM-5S 162 in FIG. 1) in a second fault domain (e.g., FD2 106 in FIG. 1). The first example approach is suitable for virtualized computing environment 100 in which load distribution is substantially even or balanced among hosts 110A-110F. Swapping the secondary virtual machines may be used to balance the overall load. The first example approach ("swapping approach") will be described in more detail with reference to FIG. 1, FIG. 2, FIG. 3 and FIG. 4.

Figure 5:
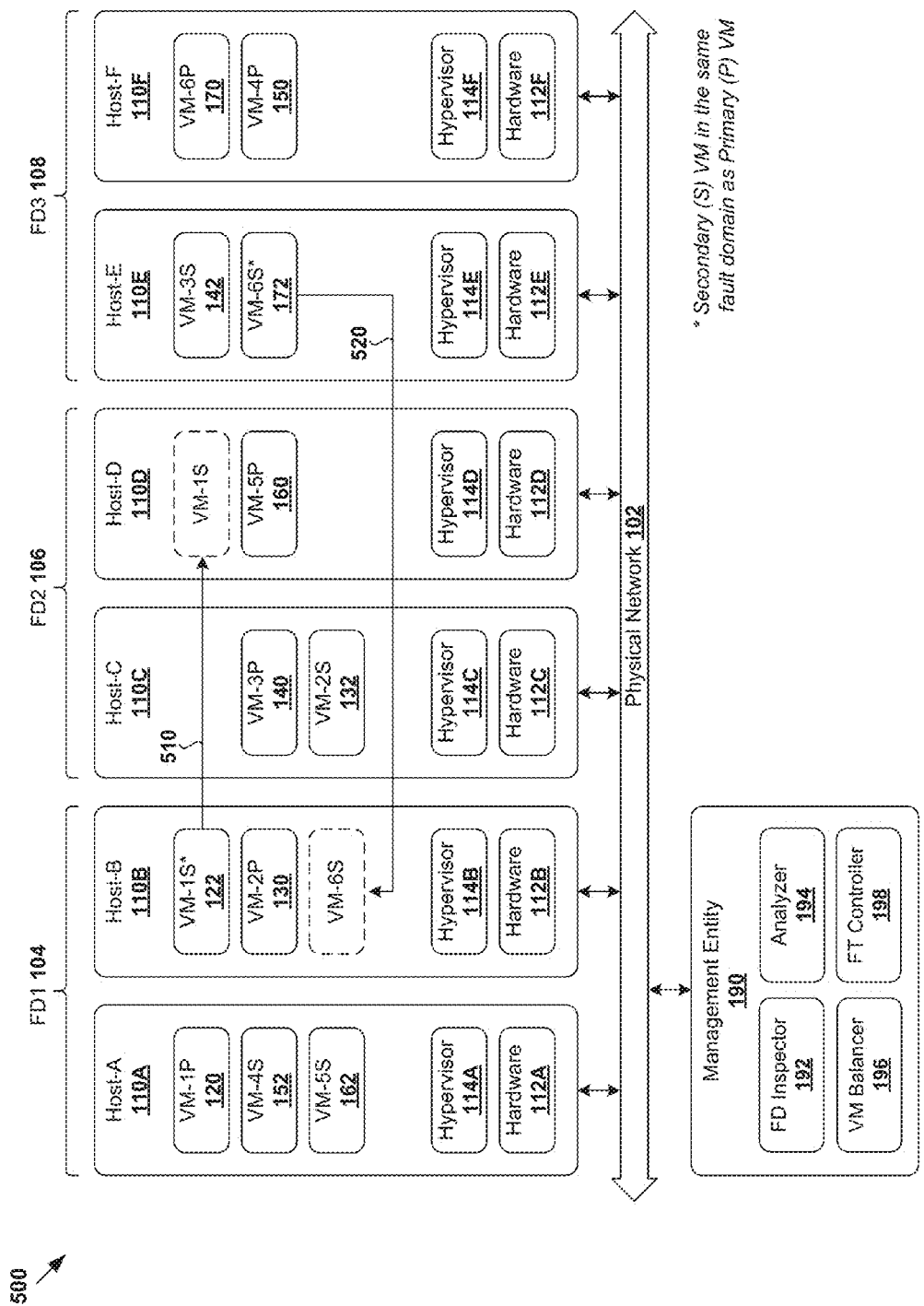
FIG. 5 is a schematic diagram illustrating an example virtualized computing environment in which fault tolerance is provided according to a second example approach.

In a second example approach, the secondary virtual machine (e.g., VM-1S 122 in FIG. 5) is also migrated from a first host (e.g., Host-B 110B in FIG. 5) in a first fault domain (e.g., FD1 104 in FIG. 5) is migrated to a second host (e.g., Host-D 110D in FIG. 5) in a second fault domain (e.g., FD2 106 in FIG. 5). However, no swapping is performed. Further, the second host (e.g., Host-D 110D in FIG. 5) is selected based on a resource availability of the second host. The second example approach is suitable for virtualized computing environment 100 in which load distribution is substantially unbalanced among hosts 110A-110F. The second example approach ("migration approach based on resource availability") will be described in more detail with reference to FIG. 5, FIG. 6, FIG. 7, FIG. 8 and FIG. 9.

According to both example approaches, the distribution of virtual machines among different fault domains may be determined and, where necessary, rebalanced to improve fault tolerance and resiliency of the virtual machines. This ensures that failure of one fault domain in which the primary virtual machine is located does not affect the secondary virtual machine in another fault domain. Since the secondary virtual machine is migrated, there will be minimal impact to the performance of the primary virtual machine. This also ensures that the user can continue interacting with the primary virtual machine while the secondary virtual machine is being migrated. In practice, examples of the present disclosure may be implemented to support disaster resistance (e.g., a fully functional disaster resistant solution).

Examples of the present disclosure are designed to be used in conjunction compatible with the conventional fault tolerance approach that place a pair of a primary virtual machine and a secondary virtual machine on different hosts. After the placement, the first or second example approach may be used to ensure that the primary virtual machine and secondary virtual machine are not only supported different hosts, but also in different fault domains. Examples of the present disclosure are designed to be adaptive and may be repeated as the configuration of the fault domains changes (e.g., the number of fault domains increases or decreases). In practice, the placement may also be based on predetermined "affinity rules" or "anti-affinity rules." For example, an affinity rule may be specified to place a pair of virtual machines on the same host. In another example, an anti-affinity rule may be specified to place a pair of virtual machines on different hosts.

In the following, a "fault domain" may be a datacenter, pod, rack and chassis, etc. For example, a chassis may refer to an enclosure in which one or more hosts are mounted (e.g., depending on the vendor's specification). A rack (e.g., server rack) may include one or more chassis stacked to make efficient use of space and position within a pod. A pod may be a modular unit of datacenter with a set of resources or infrastructure to service one or more racks. A datacenter may be a collection of hosts housed in one or more pods, racks and chassis. Any other suitable definition may be used.

Examples of the present disclosure may be implemented by any suitable entity, such as management entity 190. In the example in FIG. 1, management entity 190 includes components such as fault tolerance controller 192, fault domain inspector 194, analyser 196, virtual machine balancer 198, etc. In practice, management entity 190 may be implemented by one or more physical or virtual machines. For example, management entity 190 may be one or more virtual machines supported by hosts 110A-110F.

Swapping Approach

As will be explained using FIG. 1 to FIG. 4, the first example approach is suitable for virtualized computing environment 100 in which load distribution is substantially balanced among hosts 110A-110F. In the example in FIG. 1, each host 110A/110B/110C/110D/110E/110F supports the same number of virtual machines (i.e., two each), and each virtual machine has the same or substantially similar resource consumption requirement. In this case, two secondary virtual machines (e.g., VM-1S 122 and VM-5S 162 in FIG. 1) may swap fault domains such that the load distribution remains substantially balanced for load balancing purposes.

Figure 2:
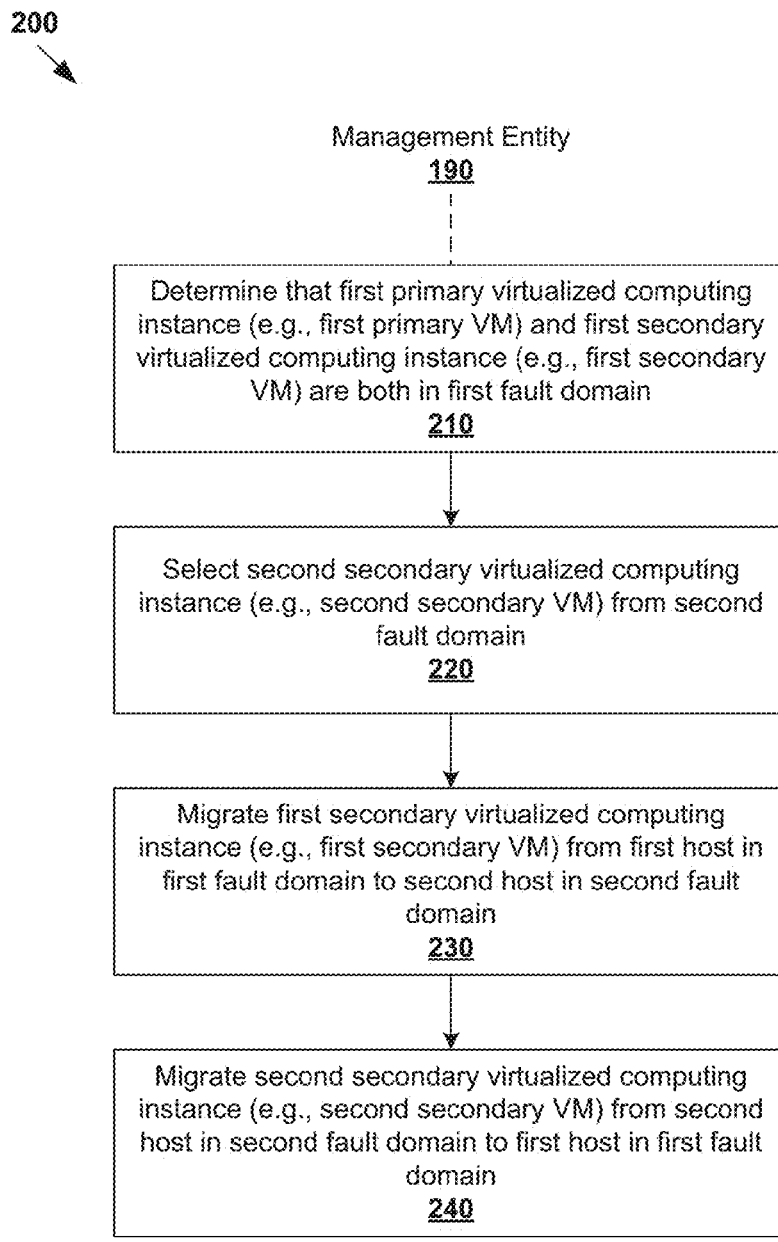
FIG. 2 is a flowchart of an example process to provide fault tolerance in a virtualized computing environment according to a first example approach.

In more detail, FIG. 2 is a flowchart of example process 200 to provide fault tolerance in virtualized computing environment 100 according to a first example approach. Example process 200 may include one or more operations, functions, or actions illustrated by one or more blocks, such as blocks 210 to 240. The various blocks may be combined into fewer blocks, divided into additional blocks, and/or eliminated based upon the desired implementation. In the following, management entity 190 will be described as an example entity to implement example process 200. In practice, any other suitable entity (e.g., physical or virtual machine(s)) may be used.

At 210 in FIG. 2, management entity 190 determines whether a first primary virtual machine (e.g., VM-1P 120) and a first secondary virtual machine (e.g., VM-1S 122) are both in a first fault domain (e.g., FD1 104). The secondary virtual machine is configured as a backup for the primary virtual machine and supported by a first host (e.g., Host-B 110B).

At 220 in FIG. 2, in response to determination that the first primary virtual machine (e.g., VM-1P 120) and the first secondary virtual machine (e.g., VM-1S 122) are both in the first fault domain (e.g., FD1 104), management entity 190 selects a second secondary virtual machine (e.g., VM-5S 162) from a second fault domain (e.g., FD2 106). The second secondary virtual machine (e.g., VM-5S 162) is configured as a backup for a second primary virtual machine (e.g., VM-5P 160) and supported by a second host (e.g., Host-C 110C).

At 230 in FIG. 2, management entity 190 migrates the first secondary virtual machine (e.g., VM-1S 122) from the first host (e.g., Host-B 110B) to the second host (e.g., Host-C 110C). See 180 in FIG. 1.

At 240 in FIG. 2, management entity 190 migrates the second secondary virtual machine (e.g., VM-5S 162) from the second host (e.g., Host-C 110C) to the first host (e.g., Host-B 110B). See 182 in FIG. 1. The migrations at 230 and 240 thereby swap the first secondary virtual machine (e.g., VM-1S 122) in the first fault domain (e.g., FD1 104) with the second secondary virtual machine (e.g., VM-5S 162) in the second fault domain (e.g., FD2 106).

In the example in FIG. 1, hosts 110A-110F each support two virtual machines before the swap. Before the swap, Host-B 110B supports VM-1S 122 and VM-2P 130, while Host-C 110C supports VM-3P 140 and VM-5S 162. The load distribution between Host-B 110B and Host-C 110C remains the substantially balanced after the swap. After the swap, Host-B 110B supports VM-2P 130 and VM-5S 162 (see dotted box), while Host-C 110C supports VM-1S 122 (see dotted box) and VM-3P 140.

In one example, the second primary virtual machine and the second secondary virtual machine may be both in the same second fault domain, in which case both may fail simultaneously if there is a failure that affects the second fault domain. However, selecting the second secondary virtual machine to migrate to the first fault domain at 220 in FIG. 2 ensures it is no longer in that same fault domain as the second primary virtual machine. This example will be explained below further using FIG. 1 (see 180 and 182), FIG. 3 (see 325 and 330) and FIG. 4 (see the first iteration).

In another example, the second primary virtual machine may not be in the second fault domain. In this case, before the second secondary virtual machine is selected for migration to the first fault domain, it is determined that the second primary virtual machine is not already in the first fault domain. This is to ensure that the migration does not cause second secondary virtual machine to be in the same fault domain as the second primary virtual machine. This example will be explained below further using FIG. 1 (see 184 and 186), FIG. 3 (see 345 and 350) and FIG. 4 (see the second iteration).

Figure 3:
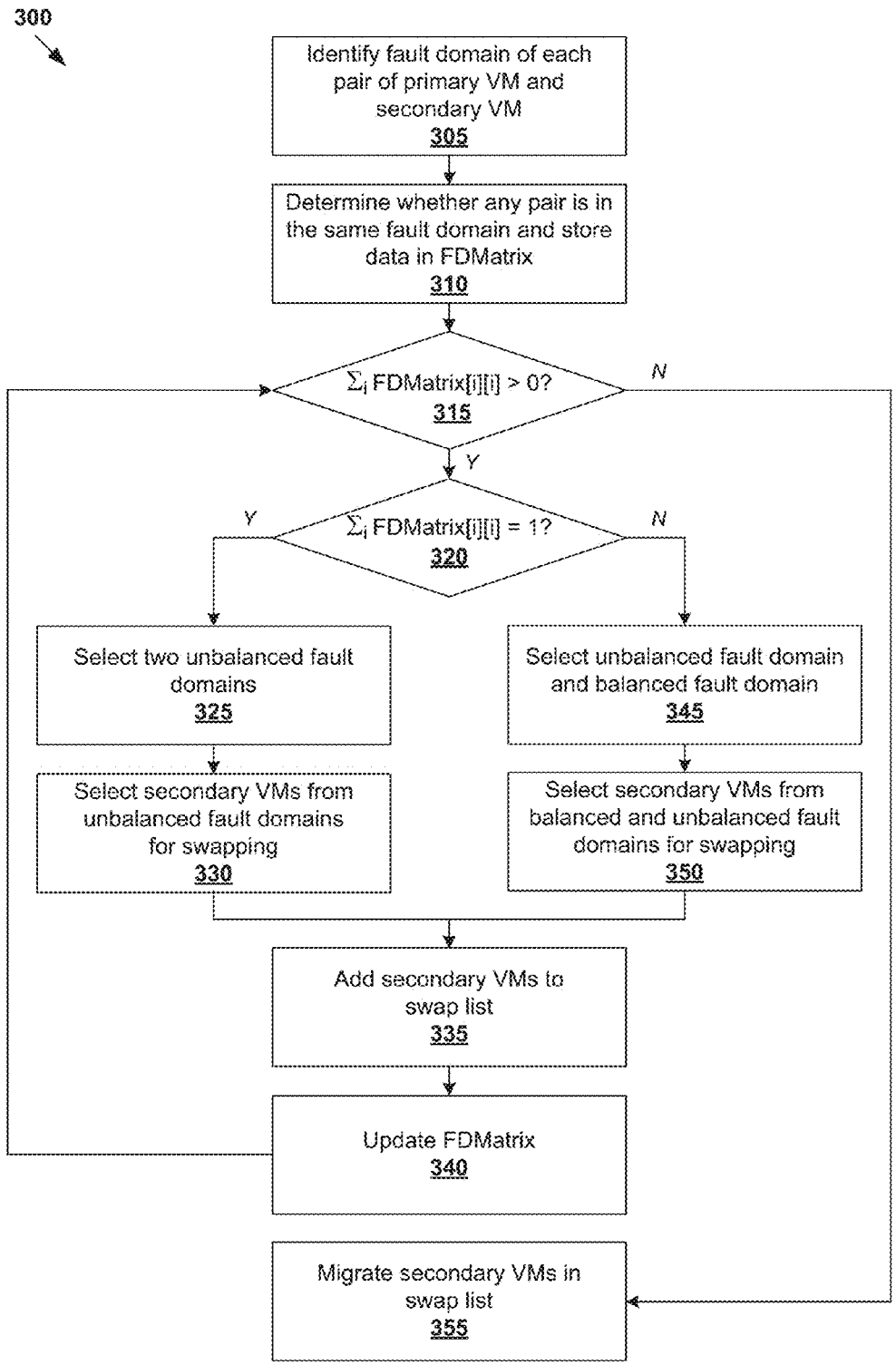
FIG. 3 is a flowchart of an example detailed process to provide fault tolerance in a virtualized computing environment according to a first example approach.

In more detail, FIG. 3 is example detailed process 300 to provide fault tolerance in a virtualized computing environment according to a first example approach. Example detailed process 300 may include one or more operations, functions, or actions illustrated by one or more blocks, such as blocks 305 to 355. The various blocks may be reordered, combined into fewer blocks, divided into additional blocks, and/or eliminated based upon the desired implementation.

In practice, example process 300 may be performed by management entity 190, such as block 305 by FD inspector 192, blocks 310 to 350 by analyser 194, and block 355 by VM balancer 196 and FT controller 198. FIG. 3 will be explained with reference to FIG. 4, which is a schematic diagram illustrating example iterations of detailed example process 300 in FIG. 3 when implemented in virtualized computing environment 100 in FIG. 1.

At 305 in FIG. 3, management entity 190 identifies the fault domain of each pair of primary virtual machine and secondary virtual machine. For example, to implement rack-awareness, racks in virtualized computing environment 100 may be scanned (e.g., by FD inspector 192) to identify the fault domain of each host and associated virtual machines. In this case, FD1 104 may represent a first rack with Host-A 110A and Host-B 110B; FD2 106 represent a second rack with Host-C 110C and Host-D 110D and FD3 108 represent a third rack with Host-E 110E and Host-F 110F.

Similarly, for datacenter-awareness, FD1 104 may be identified based on a first datacenter, FD2 106 based on a second datacenter and FD3 108 based on a third datacenter. For pod-awareness, FD1 104 may be identified based on a first pod, FD2 106 based on a second pod and FD3 108 based on a third pod. For chassis-awareness, FD1 104 may be identified based on a first chassis, FD2 106 based on a second chassis and FD3 108 based on a third chassis. In practice, any combination of datacenter, pod, rack and chassis may be used for fault domain identification.

Figure 4:
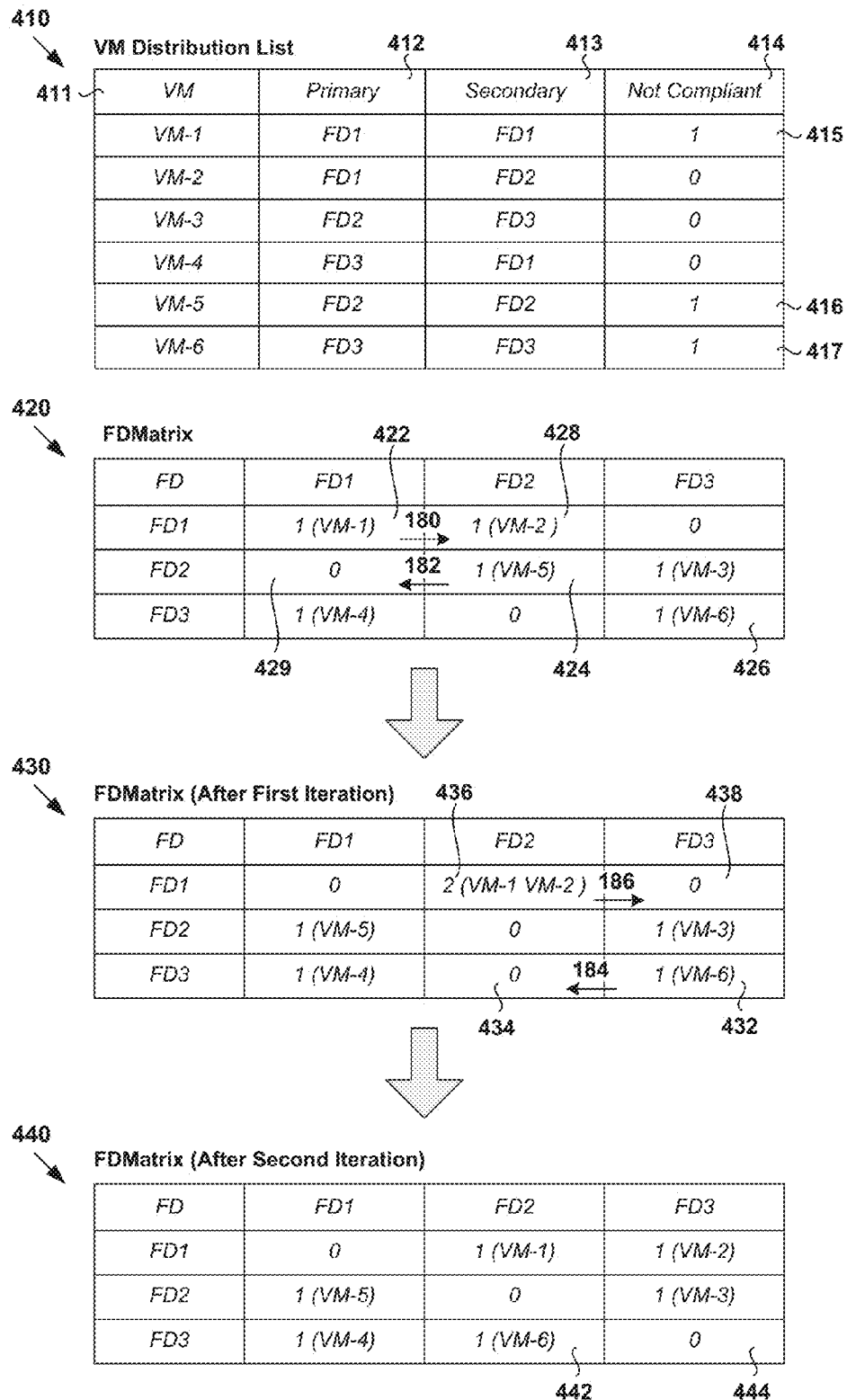
FIG. 4 is a schematic diagram illustrating example iterations of the detailed example process in FIG. 3 when implemented in the virtualized computing environment in FIG. 1.

Referring to the example in FIG. 4, data relating to the fault domain may be stored in virtual machine distribution list (see 410). For each logical virtual machine (see 411), the fault domains of respective primary virtual machine (see 412) and secondary virtual machine (see 413) are recorded. For example, both VM-1P 120 and VM-1S 122 associated with logical "VM-1" are in the same FD1 104. For logical "VM-2," however, VM-2P 130 and VM-2S 132 are in different FD1 104 and FD2 106, respectively.

At 310 in FIG. 3, management entity 190 analyses the fault domain of each primary virtual machine and secondary virtual machine to determine whether they are in the same fault domain. Referring to distribution list 410 in FIG. 4, a logical virtual machine is marked as "Not Compliant"=1 (see 414) if both its associated primary virtual machine and secondary virtual machine are in the same fault domain. For example, VM-1 is not compliant because both VM-1P 120 and VM-1S 122 are in FD1 104 (see 415). VM-5 is not compliant because both VM-5P 160 and VM-5S 162 are in FD2 106 (see 416). VM-6 is not compliant because both VM-6P 170 and VM-6S 172 are in FD3 108 (see 417). VM-2, VM-3 and VM-4 are marked as compliant.

Referring to 420 in FIG. 4, management entity 190 may also store data relating to the fault domain in a fault domain matrix (FDMatrix). The matrix is an L×L matrix, where L is the number of fault domains such as L=3 in FIG. 1. An entry in FDMatrix is denoted as FDMatrix[i][j] to represent the number of pairs of primary virtual machines in fault domain i and secondary virtual machines in fault domain j, and i, j=1, . . . , L.

Each diagonal entry FDMatrix[i][i] indicates whether there is any pair of primary virtual machine and secondary virtual machine that are both in a particular fault domain i=j (i.e., not compliant in distribution list 410). For example, at 422 in FIG. 4, FDMatrix[1][1]=1 indicates one pair of VM-1P 120 and VM-1S 122 in FD1 104. At 424, FDMatrix[2][2]=1 indicates one pair of VM-5P 160 and VM-5S 162 in FD2 106. At 426, FDMatrix[3][3]=1 indicates one pair of VM-6P 170 and VM-6S 172 in FD3 108.

Throughout the present disclosure, the term "unbalanced" may be used to describe a fault domain that includes a pair of associated primary virtual machine and secondary virtual machine (i.e., $\Sigma_{i=1}^{L}$FDMatrix[i][i]>0). On the other hand, the term "balanced" may be used to describe a fault domain that does not include any pair of associated primary virtual machine and secondary virtual machine (i.e., $\Sigma_{i=1}^{L}$FDMatrix [i][i]=0). In the example in FIG. 1, all fault domains FD1 104, FD2 106 and FD3 108 are unbalanced, and swapping of secondary virtual machines is required. FDMatrix may be iteratively updated to select secondary virtual machines for swapping.

(a) First Iteration

At 315 and 320 in FIG. 3, management entity 190 determines whether there is any unbalanced fault domain (i.e., $\Sigma_{i=1}^{L}$FDMatrix[i][i]>0) and if yes, whether there are at least two unbalanced fault domains (i.e., $\Sigma_{i=1}^{L}$ FDMatrix[i][i]>1). Referring to 420 in FIG. 4, $\Sigma_{i=1}^{L}$FDMatrix[i][i]=3.

At 325 and 330 in FIG. 3, management entity 190 selects two unbalanced fault domains and secondary virtual machines for swapping. The swap ensures that other balanced fault domains are not affected.

In the example in FIG. 4, VM-1S 122 from FD1 104 is selected based on FDMatrix[1][1]=1 and VM-5S 162 from FD2 106 based on FDMatrix[2][2]=1. As indicated at 180 in FIG. 1 and FIG. 4, VM-1S 122 is selected for migration from Host-B 110B in FD1 104 to Host-C 110C in FD2 106. Further, at 182 in FIG. 1 and FIG. 4, VM-5S 162 is selected for migration from Host-C 110C in FD2 106 to Host-B 110B in FD1 104.

At 335 in FIG. 3, management entity 190 updates a list of secondary virtual machines ("swap list") to add the following entries, each indicating a secondary virtual machine and its destination host: <VM-1S, Host-C 110C> and <VM-5S, Host-B 110B>.

At 340 in FIG. 3, management entity 190 updates FDMatrix based on the secondary virtual machines selected for swapping. Referring to 430 in FIG. 4, the resulting FDMatrix after the first iteration is shown. Since VM-1P 120 is in FD1 104 (i=1) and VM-1S 122 is to be migrated from FD1 104 (j=1) to FD2 106 (j=2), FDMatrix[1][1] is decremented and FDMatrix[1][2] incremented. Further, since VM-5P 160 is in FD2 106 (i=2) and VM-5S 162 is to be migrated from FD2 106 (j=2) to FD1 104 (j=1), FDMatrix[2][2] is decremented and FDMatrix[2][1] incremented.

As such, the following updates are performed to the FDMatrix at 420 in FIG. 4 to obtain the updated FDMatrix at 430 in FIG. 4:

FDMatrix[1][1]=1−1=0 (see 180 and 422 in FIG. 4)
FDMatrix[1][2]=1+1=2 (see 180 and 428 in FIG. 4)
FDMatrix[2][2]=1−1=0 (see 182 and 424 in FIG. 4)
FDMatrix[1][2]=0+1=1 (see 182 and 429 in FIG. 4)

(b) Second Iteration

After 340 in FIG. 3, example process 300 once again proceeds to 315 and 320 in FIG. 3. In particular, management entity 190 determines whether there is any unbalanced fault domain (i.e., $\Sigma_{i=1}^{L}$FDMatrix[i][i]>0) and if yes, whether there are at least two unbalanced fault domains (i.e., $\Sigma_{i=1}^{L}$FDMatrix[i][i]>1). Referring to the updated FDMatrix at 430 in FIG. 4, $\Sigma_{i=1}^{L=3}$FDMatrix[i][i]=FDMatrix[3][3]=1 (see 432) after the first iteration. In other words, there is only one unbalanced fault domain (i.e., FD3 108) this time. Management entity 190 therefore proceeds to 345 and 350 in FIG. 3 as follows.

At 345 and 350 in FIG. 3, since there is only one unbalanced fault domain, management entity 190 selects an unbalanced fault domain and a balanced fault domain, and secondary virtual machines from those fault domains for swapping. Referring to the updated FDMatrix at 430 in FIG. 4, FD3 108 remains as the only unbalanced fault domain due to the presence of both VM-6P 170 and VM-6S 172, and FD1 104 and FD2 106 are balanced.

From the updated FDMatrix at 430 in FIG. 4, a secondary virtual machine from the same row as VM-6S 172 (i.e., FDMatrix[3][x], x=1, 2, 3) cannot be selected because its primary virtual machine is also in FD3 108. For example, VM-4S 152 on Host-A 110A cannot be selected because VM-4P 150 on Host-F 110F is already in FD3 108. In other words, if VM-6S 172 is swapped with VM-4S 152, VM-4S 152 will end up in the same FD3 108 as VM-4P 150, and FD3 108 will remain unbalanced.

Further, a secondary virtual machine from the same column as VM-6S 172 (i.e., FDMatrix[x][3], x=1, 2, 3) cannot be selected because the secondary virtual machine is in FD3 108. For example, VM-3S 142 on Host-E 110E cannot be selected because it is also in FD3 108. In other words, even if VM-6S 172 is swapped with VM-3S 142, VM-6S 172 remains in FD3 108, and FD3 108 will remain unbalanced.

Based on the above, VM-5S 162 in FD1 104, VM-1S 122 in FD2 106 and VM-2S 132 in FD2 106 as candidates to be swapped with VM-6S 172. In the example in FIG. 4, VM-2S 132 is selected for swapping. This involves selecting VM-6S 172 for migration from Host-E 110E in FD3 108 to Host-D 110D in FD2 106 (see 184 in FIG. 1 and FIG. 4). This also involves selecting VM-2S 132 for migration from Host-D 110D in FD2 106 to Host-E 110E in FD3 108 (see 186 in FIG. 1 and FIG. 4).

At 335 in FIG. 3, management entity 190 updates the list of secondary virtual machines to add the following entries: <VM-6S, Host-D 110D> and <VM-2S, Host-E 110E>.

At 340 in FIG. 3, management entity 190 updates FDMatrix based on the secondary virtual machines selected for swapping. Since VM-6P 170 is in FD3 108 (i=3) and VM-6S 172 is to be migrated from FD3 108 (j=3) to FD2 106 (j=2), FDMatrix[3][3] is decremented and FDMatrix[3][2] incremented. Further, since VM-2P 130 is in FD1 104 (i=1) and VM-2S 132 is to be migrated from FD2 106 (j=2) to FD3 108 (j=3), FDMatrix[1][2] is decremented and FDMatrix[1][3] incremented.

As such, the following updates are performed to the FDMatrix at 430 in FIG. 4, which result in the updated FDMatrix at 440 in FIG. 4:
  FDMatrix[3][3]=1−1=0 (see 184 and 432 in FIG. 4)
  FDMatrix[3][2]=0+1=1 (see 184 and 434 in FIG. 4)
  FDMatrix[1][2]=2−1=1 (see 186 and 436 in FIG. 4)
  FDMatrix[1][3]=0+1=1 (see 186 and 438 in FIG. 4)
  (c) Final Iteration After 340 in FIG. 3, example process 300 once again proceeds to 315 and 320 in FIG. 3. In particular, management entity 190 determines whether there is any unbalanced fault domain (i.e., $\Sigma_{i=1}^{L}$FDMatrix[i][i]>0) at 315 and if yes, whether there are at least two unbalanced fault domains (i.e., $\Sigma_{i=1}^{L}$ FDMatrix[i][i]>1) at 320. Referring to the updated FDMatrix at 440 in FIG. 4, $\Sigma_{i=1}^{L}$ FDMatrix[i][i]=0, which means all fault domains are balanced and management entity 190 proceeds to 355 in FIG. 3.

At 355 in FIG. 3, management entity 190 migrates the secondary virtual machines included in the swap list below.
  <VM-1S, Host-C 110C> and <VM-5S, Host-B 110B>
  <VM-6S, Host-D 110D> and <VM-2S, Host-E 110E>

To swap VM-1S 122 with VM-5S 162, management entity 190 instructs Host-B 110B to migrate VM-1S 122 to Host-C 110C, and Host-C 110C to migrate VM-5S 162 to Host-B 110B. Further, to swap VM-6S 172 with VM-2S 132, management entity 190 instructs Host-E 110E to migrate VM-6S 172 to Host-D 110D, and Host-D 110D to migrate VM-2S 132 to Host-E 110E. In practice, VM balancer 196 may send, to FT controller 198, the swap list determined by analyser 194. FT controller 198 may then instruct the relevant hosts to perform the migrations (e.g., using vMotion by VMware, Inc.).

Migration Approach Based on Resource Availability

FIG. 5 is a schematic diagram illustrating example virtualized computing environment 500 in which fault tolerance is provided according to a second example approach. It should be understood that virtualized computing environment 500 may include additional and/or alternative components than that shown, depending on the desired implementation. For simplicity, the same reference numerals are used for like elements shown in FIG. 1.

Similar to the example in FIG. 1, primary and secondary virtual machines in FIG. 5 are distributed across different hosts to provide fault tolerance. VM-1P 120 is supported by Host-A 110A and VM-1S 122 by Host-B 110B. This ensures that the failure of one host (e.g., Host-A 110A) does not impact on both the primary virtual machine and secondary virtual machine. For the same reason, VM-2P 130 and VM-2S 132 are supported by respective Host-B 110B and Host C 110C; VM-3P 140 and VM-3S 142 by Host-C 110C and Host-E 110E; VM-4P 150 and VM-4S 152 by Host-F 110F and Host-A 110A; VM-5P 160 and VM-5S 162 by Host-D 110D and Host-A 110A; and VM-6P 170 and VM-6S 172 by Host-F 110F and Host-E 110E.

Similar to the first example approach in FIG. 1, although VM-1P 120 and VM-1S 122 are supported by different hosts (i.e., Host-A 110A and Host-B 110B, respectively), both hosts may fail simultaneously if they are within the same fault domain. According to the second example approach in FIG. 5, a secondary virtual machine (e.g., VM-1S 122) in a first fault domain (e.g., FD1 104) may be migrated to a second fault domain (e.g., FD2 106) to improve fault tolerance.

However, unlike the first example approach in FIG. 1, load distribution among hosts 110A-110F in FIG. 5 is not substantially balanced. For example, this may be caused by hosts 110A-110F supporting different number of virtual machines, each having a different resource consumption requirement. In this case, it is not necessary to swap the secondary virtual machine (e.g., VM-1S 122) in the first fault domain (e.g., FD1 104) with another secondary virtual machine in the second fault domain (e.g., FD6 108).

Figure 6:
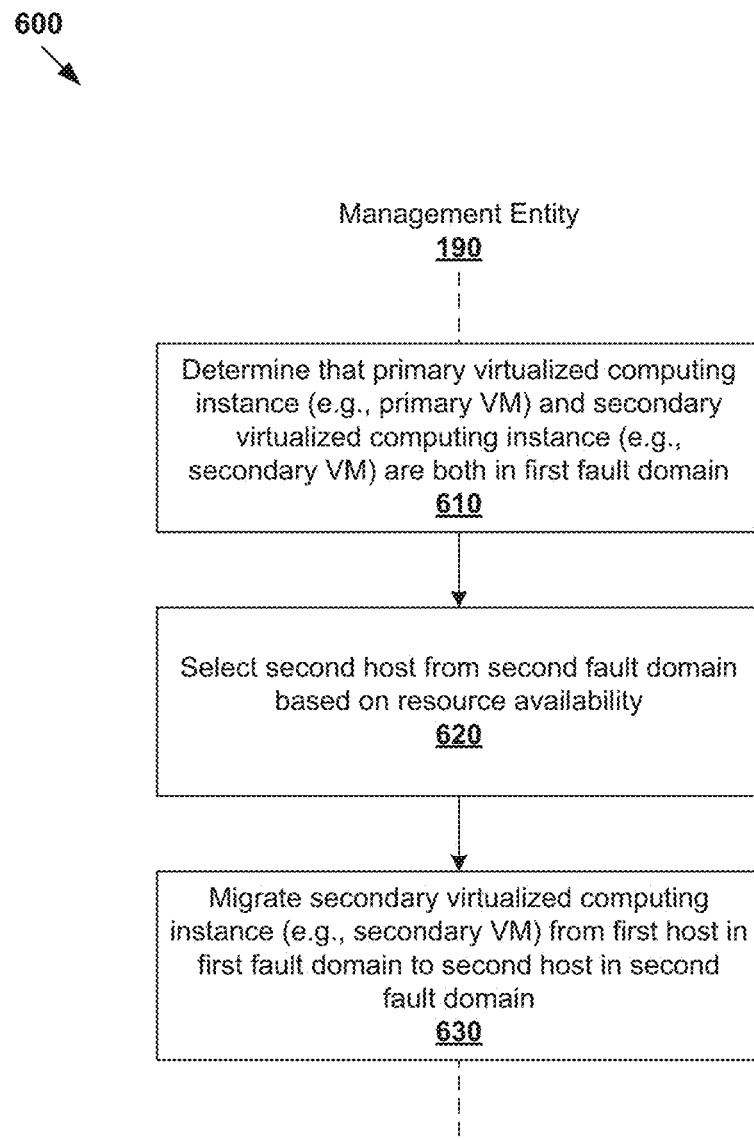
FIG. 6 is a flowchart of an example process to provide fault tolerance in a virtualized computing environment according to a second example approach.

In more detail, FIG. 6 is a flowchart of example process 600 to provide fault tolerance in a virtualized computing environment according to a second example approach. Example process 600 may include one or more operations, functions, or actions illustrated by one or more blocks, such as blocks 610 to 630. The various blocks may be combined into fewer blocks, divided into additional blocks, and/or eliminated based upon the desired implementation. In the following, management entity 190 will be described as an example entity to implement example process 600.

At 610 in FIG. 6, management entity 190 determines whether a primary virtual machine (e.g., VM-1P 120) and a secondary virtual machine (e.g., VM-1S 122) are both in a first fault domain (e.g., FD1 104). The secondary virtual machine is configured as a backup for the primary virtual machine and supported by a first host (e.g., Host-B 110B).

At 620 in FIG. 6, in response to determination that the primary virtual machine (e.g., VM-1P 120) and secondary virtual machine (e.g., VM-1S 122) are both in a first fault domain (e.g., FD1 104), management entity 190 selects a second host (e.g., Host-D 110D) from a second fault domain (e.g., FD2 106) based on a resource availability of the second host (e.g., Host-D 110D). As will be explained further using FIG. 7, the resource availability may include CPU availability, memory availability, storage resource availability, network resource availability, or any combination thereof, etc.

At 630 in FIG. 6, management entity 190 migrates the secondary virtual machine (e.g., VM-1S 122) from the first host (e.g., Host-B 110B) to the second host (e.g., Host-D 110D). See 510 in FIG. 1. After migration, VM-1P 120 remains in FD1 104, but VM-1S 122 is now in a different FD2 106 (see dotted box labelled "VM-1S"), thereby improving fault tolerance.

More detailed examples will be described using FIG. 7, which is example detailed process 700 to provide fault tolerance in a virtualized computing environment according to a second example approach. Example detailed process 700 may include one or more operations, functions, or actions illustrated by one or more blocks, such as blocks 705 to 750. The various blocks may be combined into fewer blocks, divided into additional blocks, and/or eliminated based upon the desired implementation.

In practice, example process 700 may be performed by management entity 190, such as block 705 by FD inspector 192, blocks 710 to 745 by analyser 194, and block 750 by VM balancer 196 and FT controller 198. FIG. 7 will be explained with reference to FIG. 8 and FIG. 9. In particular, FIG. 8 is a schematic diagram illustrating example distribution list 810, fault domain matrix 820 and resource availability table 830 generated when detailed example process 700 in FIG. 7 is implemented in virtualized computing environment 500 in FIG. 5. FIG. 9 is a schematic diagram illustrating example iterations of detailed example process 700 in FIG. 7 when implemented in virtualized computing environment 500 in FIG. 5.

Figure 7:
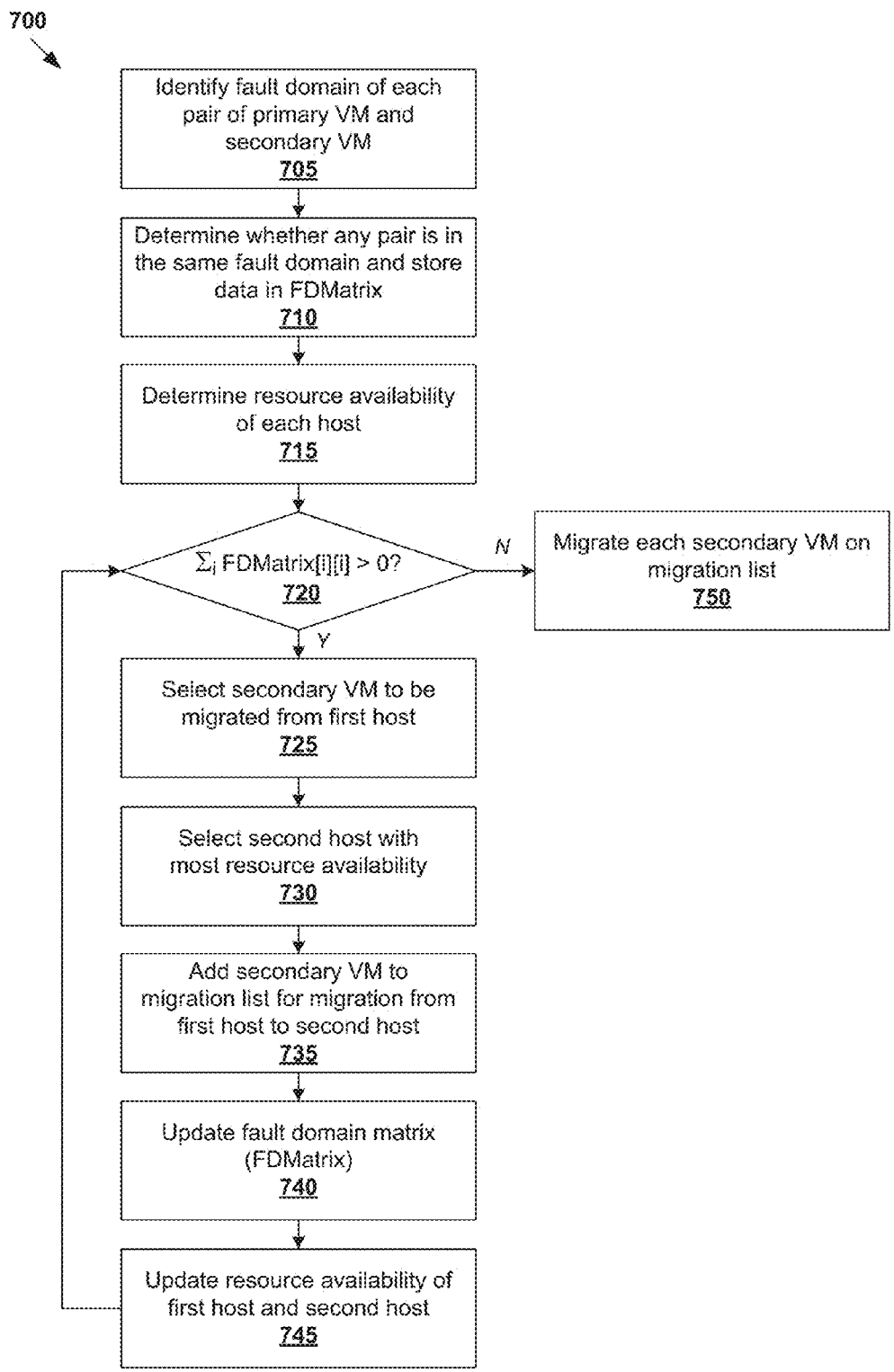
FIG. 7 is a flowchart of an example detailed process to provide fault tolerance in a virtualized computing environment according to a second example approach.

At 705 in FIG. 7, management entity 190 identifies the fault domain of each pair of primary virtual machine and secondary virtual machine. Similar to 305 in FIG. 3, to implement rack-awareness, racks in virtualized computing environment 100 may be scanned (e.g., by FD inspector 192) to identify the fault domain of each host and associated virtual machines. In this case, FD1 104 may represent a first rack with Host-A 110A and Host-B 110B; FD2 106 represent a second rack with Host-C 110C and Host-D 110D and FD3 108 represent a third rack with Host-E 110E and Host-F 110F.

Similar to 305 in FIG. 3, for datacenter-awareness, FD1 104 may be identified based on a first datacenter, FD2 106 based on a second datacenter and FD3 108 based on a third datacenter. For pod-awareness, FD1 104 may be identified based on a first pod, FD2 106 based on a second pod and FD3 108 based on a third pod. For chassis-awareness, FD1 104 may be identified be based on a first chassis, FD2 106 based on a second chassis and FD3 108 based on a third chassis. In practice, any combination of datacenter, pod, rack and chassis may be used for fault domain identification.

Referring also to FIG. 8, data relating to the fault domain may be stored in a "distribution list" (see 810). For each logical virtual machine (see 811), the fault domain of corresponding primary virtual machine (see 812) and secondary virtual machine (see 813) is recorded.

At 710 in FIG. 7, management entity 190 analyses the fault domain of each primary virtual machine and secondary virtual machine to determine whether they are in the same fault domain. Referring to distribution list 810 in FIG. 8, a logical virtual machine is marked as "Not Compliant"=1 (see 814) if both the primary virtual machine and secondary virtual machine are in the same fault domain. For example (see 815), VM-1 is not compliant because both VM-1P 120 and VM-1S 122 are in FD1 104. In another example (see 816), VM-6 is not compliant because both VM-6P 170 and VM-6S 172 are in FD3 108. VM-2, VM-3, VM-4 and VM-5 are marked as compliant.

Referring also to 820 in FIG. 8, management entity 190 stores data relating to the fault domain in a fault domain matrix (FDMatrix). Similar to the example in FIG. 4, the matrix is an L×L matrix, where L is the number of fault domains such as L=3 in FIG. 1. Each entry FDMatrix[i][j] represents the number of pair of primary virtual machine in fault domain i and secondary virtual machine in fault domain j, where i, j=1, . . . , L.

Each diagonal entry FDMatrix[i][i] indicates whether there is any pair of primary virtual machine and secondary virtual machine that are both in a particular fault domain i=j (i.e., not compliant in distribution list 810). For example, at 822 in FIG. 8, FDMatrix[1][1]=1 indicates one pair of VM-1P 120 and VM-1S 122 in FD1 104. At 824, FDMatrix[3][3]=1 indicates one pair of VM-6P 170 and VM-6S 172 in FD3 108. In other words, FD1 104 and FD3 108 are each unbalanced and migration is required. FD2 106 is balanced.

At 715 in FIG. 7, management entity 190 determines a resource availability of each host 110A/110B/110C/110D/110E/110F. In one example, the resource availability ($RA_m$) may be a weighted availability of multiple resources (e.g., CPU, memory, storage resource, network resource) that is determined based on the following expression:

$$RA_m = \Sigma_n w_{Rn} R_n.$$

In the above expression, m=A, B, C, D, E, F represents a particular host (e.g., m=A for Host-A 110A), n=1, 2, . . . , 4 represents a particular type of resource (e.g., 1=CPU, 2=memory, 3=storage resource and 4=network resource) and $R_n$ represents the availability of resource n. Resource availability $R_n$ may be defined in terms of any suitable unit, such as CPU unit for CPU availability, 2 GB for memory availability, etc.

Weights $w_{R1}$, $w_{R2}$, $w_{R3}$ and $w_{R4}$ represent the importance of the availability of corresponding resources n=1, 2, . . . , 4. Any suitable values may be used. For example, if the CPU availability is more important than memory availability, weights $w_{R1}=0.5 > w_{R2}=0.3$ may be used. If the network resource availability is not important at all, its weight may be set to zero (i.e., $w_{R4}=0$). The weights are not fixed and may be changed at any time.

Referring also to 830 in FIG. 8, an example resource availability table with resource availability ($RA_m$) is used to compare the resource availability of hosts 110A-110F. In this example, resource availability is sorted from most to least (i.e., $RA_D > RA_B > RA_C > RA_E > RA_F > RA_A$). Host-D 110D has the most resource availability (see $RA_D$ at 832), followed by Host-B 110B (see $RA_B$ at 834), Host-C 110C (see $RA_C$ at 836), Host-E 110E (see $RA_E$ at 838) and Host-F 110F (see $RA_F$ at 840). Host-A 110A has the least resource availability (see $RA_A$ at 842).

(a) First Iteration

At 720 in FIG. 7, management entity 190 determines whether there is any unbalanced fault domain (i.e., $\Sigma_{i=1}^{L}$FDMatrix[i][i]>0). Referring to 820 in FIG. 8 again, $\Sigma_{i=1}^{L}$FDMatrix[i][i]=2. In particular, FDMatrix[1][1]=1 (see 822) because VM-1P 120 and VM-1S 122 are both in FD1 104. Further, FDMatrix[3][3]=1 (see 824) because VM-6P 170 and VM-6S 172 are both in FD3 108.

At 725 in FIG. 7, management entity 190 selects a secondary virtual machine supported by a first host for migration. In the example in FIG. 8 (see 822), VM-1S 122 supported by Host-B 110B in FD1 104 is selected based on FDMatrix[1][1]=1.

At 730 in FIG. 7, management entity 190 selects a second host to which the secondary virtual machine selected at 725 is migrated. In the example in FIG. 8 (see 832), Host-D 110D in a different fault domain (i.e., FD2 106) and having the most resource availability (i.e., $RA_D > RA_B > RA_C > RA_E > RA_F > RA_A$) is selected.

At 735 in FIG. 7, management entity 190 updates a list of secondary virtual machines ("migration list") to add the following entry that indicates the secondary virtual machine and its destination host: <VM-1S, Host-D 110D>.

At 740 in FIG. 7, management entity 190 updates FDMatrix based on the secondary virtual machine selected for migration. Since VM-1P 120 is in FD1 104 (i=1) and VM-1S 122 is to be migrated from FD1 104 (j=1) to FD2 106 (j=2), FDMatrix[1][1] is decremented and FDMatrix[1][2] incremented. As such, the following updates are performed to the FDMatrix at 820 in FIG. 8 to obtain the updated FDMatrix at 910 in FIG. 9:

FDMatrix[1][1]=1−1=0 (see 510 and 822 in FIG. 4)
FDMatrix[1][2]=1+1=2 (see 510 and 826 in FIG. 4)

At 745 in FIG. 7, management entity 190 updates the resource availability of the relevant hosts relating to the migration. In the example in FIG. 8, management entity 190 increases the resource availability of Host-B 110B (i.e., $RA_B$) and decreases that of Host-D 110D (i.e., $RA_D$) based on a resource consumption of VM-1S 122. The resource consumption of a virtual machine may be expressed as a weighted value of CPU consumption, memory consumption, storage resource consumption and network resource consumption. Comparing the updated resource availability at 920 FIG. 9, Host-B 110B now has the most resource available (see 922).

(b) Second Iteration

After 745 in FIG. 7, example process 700 once again proceeds to 720 in FIG. 7. In particular, management entity 190 determines whether there is any unbalanced fault domain (i.e., $\Sigma_{i=1}^{L} \text{FDMatrix}[i][i] > 0$). Referring to the updated FDMatrix at 910 in FIG. 9, $\Sigma_{i=1}^{L} \text{FDMatrix}[i][i]=$ FDMatrix[3][3]=1 because VM-6P 170 and VM-6S 172 are both in FD3 108.

At 725 in FIG. 7, management entity 190 selects a secondary virtual machine to be migrated from a first host. In the example in FIG. 9, VM-6S 172 supported by Host-E 110E in FD3 108 is selected.

At 730 in FIG. 7, management entity 190 selects a second host to which the secondary virtual machine selected at 725 is migrated. Comparing the resource availability at 920 in FIG. 9, Host-B 110B (see 922) in a different fault domain (i.e., FD1 104) and having the most resource availability (i.e., $RA_B > RA_D > RA_C > RA_E > RA_F > RA_A$) is selected.

At 735 in FIG. 7, management entity 190 updates the migration list to add the following entry that indicates the secondary virtual machine and its destination host: <VM-6S, Host-B 110B>.

At 740 in FIG. 7, management entity 190 updates FDMatrix. Since VM-6P 170 is in FD3 108 (i=3) and VM-6S 172 is to be migrated from FD3 108 (j=3) to FD1 104 (j=1), FDMatrix[3][3] is decremented and FDMatrix[3][1] incremented. As such, the following updates are performed to the FDMatrix at 910 in FIG. 9 to obtain the updated FDMatrix at 910 in FIG. 9:

FDMatrix[3][3]=1−1=0 (see 520, 912 and 932 in FIG. 9)
FDMatrix[3][1]=1+1=2 (see 520, 914 and 934 in FIG. 9)

At 745 in FIG. 7, management entity 190 updates the resource availability of the relevant hosts. In the example in FIG. 8, management entity 190 increases the resource availability of Host-E 110E (i.e., $RA_E$) and decreases that of Host-B 110B (i.e., $RA_B$) based on a resource consumption of VM-6S 172. Comparing the updated resource availability at 940 FIG. 9, Host-E 110E now has the most resource available (see 942).

(c) Final Iteration

After 745 in FIG. 7, example process 700 once again proceeds to 720 in FIG. 7. In particular, management entity 190 once again determines whether there is any unbalanced fault domain (i.e., $\Sigma_{i=1}^{L} \text{FDMatrix}[i][i] > 0$). Referring to the updated FDMatrix at 930 in FIG. 9, $\Sigma_{i=1}^{L} \text{FDMatrix}[i][i]=0$. In other words, all fault domains are now balanced, which leads to 750 in FIG. 7.

At 750 in FIG. 7, management entity 190 migrates the secondary virtual machines on the migration list <VM-1S, Host-D 110D> and <VM-6S, Host-B 110B>. This may involve instructing Host-B 110B to migrate VM-1S 122 to Host-D 110D, and Host-E 110E to migrate VM-6S to Host-B 110B. In practice, VM balancer 196 may send, to FT controller 198, the swap list determined by analyser 194. FT controller 198 may then instruct the relevant hosts to perform the migrations (e.g., using vMotion by VMware, Inc.).

Computing System

Figure 10:
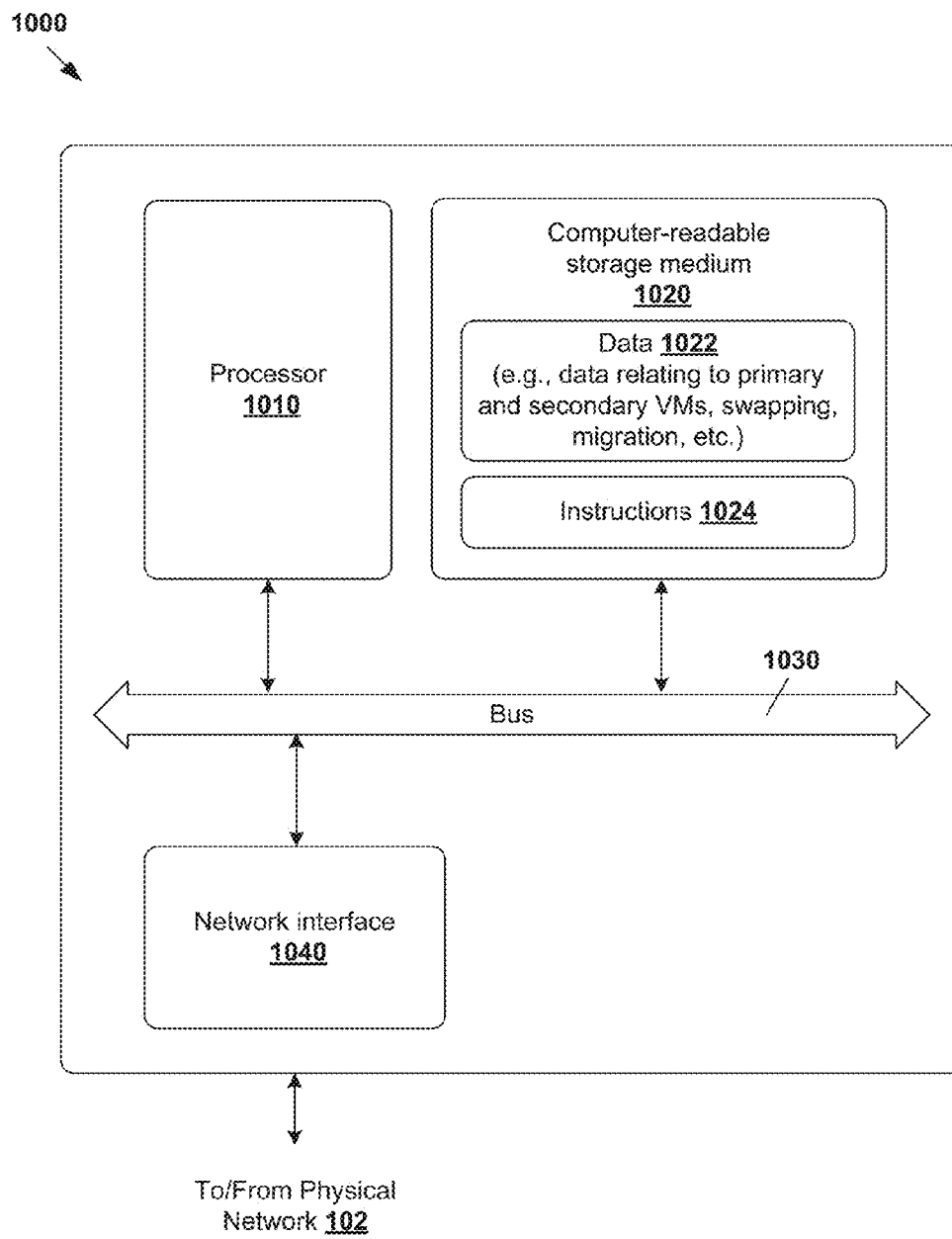
FIG. 10 is a schematic diagram illustrating an example computer system acting as a management entity.

The above examples can be implemented by hardware (including hardware logic circuitry), software or firmware or a combination thereof. FIG. 10 is a schematic diagram illustrating example computing system 1000 acting as management entity 190. Example computing system 1000 may include processor 1010, computer-readable storage medium 1020, network interface 1040, and bus 1030 that facilitates communication among these illustrated components and other components. In practice, management entity 190 may be one or more physical or virtual machines.

Processor 1010 is to perform processes described herein with reference to the drawings. Computer-readable storage medium 1020 may store any suitable data 1022, such as data relating to primary and secondary virtual machines, fault domain, resource availability, resource consumption, swap list, migration list, etc. Computer-readable storage medium 1020 may further store computer-readable instructions 1024 which, in response to execution by processor 1010, cause processor 1010 to perform processes described herein with reference to FIG. 1 to FIG. 9.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium," as the term is used herein, includes any mechanism that provides (i.e., stores and/or transmits) information in a form accessible by a machine (e.g., a computer, network device, personal digital assistant (PFD1), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to provide fault tolerance in a virtualized computing environment with a first fault domain and a second fault domain, the method comprising:
    determining whether a primary virtualized computing instance and a secondary virtualized computing instance are both in the first fault domain, wherein the secondary virtualized computing instance is configured as a backup for the primary virtualized computing instance and supported by a first host;
    in response to determination that the primary virtualized computing instance and secondary virtualized computing instance are both in the first fault domain,
        determining a resource availability of each of a plurality of hosts that include the first host and the second host, wherein the second host is in the second fault domain;
        comparing the resource availability of each of the plurality of hosts to select the second host with a most resource availability;
        based on a resource consumption of the secondary virtualized computing instance, updating a resource availability of the first host and a resource availability of the second host; and
        migrating the secondary virtualized computing instance from the first host to the second host based on the updated resource availability of the first host and the updated resource availability of the second host, thereby migrating the secondary virtualized computing instance from the first fault domain to the second fault domain.

2. The method of claim 1, wherein the determining the resource availability of each of a plurality of hosts comprises:
    determining the resource availability to be a weighted value of one or more of: central processing unit (CPU) availability, memory availability, storage resource availability and network resource availability.

3. The method of claim 1, wherein the updating the resource availability of the first host and the resource availability of the second host comprises:
    based on the resource consumption of the secondary virtualized computing instance, increasing the resource availability of the first host and decreasing the resource availability of the second host.

4. The method of claim 1, wherein the method further comprises:
    identifying the first fault domain based on one or more of: a first datacenter, a first pod, a first rack and a first chassis in the virtualized computing environment; and
    identifying the second fault domain based on one or more of: a second datacenter, a second pod, a second rack and a second chassis in the virtualized computing environment.

5. The method of claim 1, wherein load distribution is substantially unbalanced among the plurality of hosts in the virtualized computing environment.

6. The method of claim 1, wherein the method is performed by a management entity that is configured to instruct the first host to migrate the secondary virtualized computing instance to the second host.

7. A non-transitory computer-readable storage medium that includes a set of instructions which, in response to execution by a processor computing system, causes the processor to perform a method to provide fault tolerance in a virtualized computing environment with a first fault domain and a second fault domain, wherein the method comprises:
    determining whether a primary virtualized computing instance and a secondary virtualized computing instance are both in the first fault domain, wherein the secondary virtualized computing instance is configured as a backup for the primary virtualized computing instance and supported by a first host;
    in response to determination that the primary virtualized computing instance and secondary virtualized computing instance are both in the first fault domain,
        determining a resource availability of each of a plurality of hosts that include the first host and the second host, wherein the second host is in the second fault domain;
        comparing the resource availability of each of the plurality of hosts to select the second host with a most resource availability;
        based on a resource consumption of the secondary virtualized computing instance, updating a resource availability of the first host and a resource availability of the second host; and
        migrating the secondary virtualized computing instance from the first host to the second host based on the updated resource availability of the first host and the updated resource availability of the second host, thereby migrating the secondary virtualized computing instance from the first fault domain to the second fault domain.

8. The non-transitory computer-readable storage medium of claim 7, wherein the determining the resource availability of each of a plurality of hosts comprises:
   determining the resource availability to be a weighted value of one or more of: central processing unit (CPU) availability, memory availability, storage resource availability and network resource availability.

9. The non-transitory computer-readable storage medium of claim 7, wherein the updating the resource availability of the first host and the resource availability of the second host comprises:
   based on the resource consumption of the secondary virtualized computing instance, increasing the resource availability of the first host and decreasing the resource availability of the second host.

10. The non-transitory computer-readable storage medium of claim 7, wherein the method further comprises:
   identifying the first fault domain based on one or more of: a first datacenter, a first pod, a first rack and a first chassis in the virtualized computing environment; and
   identifying the second fault domain based on one or more of: a second datacenter, a second pod, a second rack and a second chassis in the virtualized computing environment.

11. The non-transitory computer-readable storage medium of claim 7, wherein load distribution is substantially unbalanced among the plurality of hosts in the virtualized computing environment.

12. The non-transitory computer-readable storage medium of claim 7, wherein the method is performed by a management entity that is configured to instruct the first host to migrate the secondary virtualized computing instance to the second host.

13. A computer system to provide fault tolerance in a virtualized computing environment with a first fault domain and a second fault domain, comprising:
   a processor;
   a non-transitory computer-readable storage medium storing instructions that, in response to execution by the processor, cause the processor to:
   determine whether a primary virtualized computing instance and a secondary virtualized computing instance are both in the first fault domain, wherein the secondary virtualized computing instance is configured as a backup for the primary virtualized computing instance and supported by a first host;
   in response to determination that the primary virtualized computing instance and secondary virtualized computing instance are both in the first fault domain,
   determine a resource availability of each of a plurality of hosts that include the first host and the second host, wherein the second host is in the second fault domain;
   compare the resource availability of each of the plurality of hosts to select the second host with a most resource availability;
   based on a resource consumption of the secondary virtualized computing instance, update a resource availability of the first host and a resource availability of the second host; and
   migrate the secondary virtualized computing instance from the first host to the second host based on the updated resource availability of the first host and the updated resource availability of the second host, thereby migrating the secondary virtualized computing instance from the first fault domain to the second fault domain.

14. The computer system of claim 13, wherein the instructions for determining the resource availability of each of a plurality of hosts cause the processor to:
   determine the resource availability to be a weighted value of one or more of: central processing unit (CPU) availability, memory availability, storage resource availability and network resource availability.

15. The computer system of claim 13, wherein the instructions for updating the resource availability of the first host and the resource availability of the second host further cause the processor to:
   based on the resource consumption of the secondary virtualized computing instance, increase the resource availability of the first host and decrease the resource availability of the second host.

16. The computer system of claim 13, wherein the instructions further cause the processor to:
   identify the first fault domain based on one or more of: a first datacenter, a first pod, a first rack and a first chassis in the virtualized computing environment; and
   identify the second fault domain based on one or more of: a second datacenter, a second pod, a second rack and a second chassis in the virtualized computing environment.

17. The computer system of claim 13, wherein load distribution is substantially unbalanced among the plurality of hosts in the virtualized computing environment.

18. The computer system of claim 13, wherein the instructions cause the processor to implement a management entity that is configured to instruct the first host to migrate the secondary virtualized computing instance to the second host.

* * * * *